(12) United States Patent
Kowno et al.

(10) Patent No.: US 7,154,544 B2
(45) Date of Patent: Dec. 26, 2006

(54) DIGITAL CAMERA INCLUDING A ZOOM BUTTON AND/OR A TOUCH TABLET USEABLE FOR PERFORMING A ZOOM OPERATION

(75) Inventors: Yousuke Kowno, Yokohama (JP); Akira Ohmura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 491 days.

(21) Appl. No.: 10/095,524

(22) Filed: Mar. 13, 2002

(65) Prior Publication Data

US 2002/0093578 A1 Jul. 18, 2002

Related U.S. Application Data

(63) Continuation of application No. 09/731,919, filed on Dec. 8, 2000, now abandoned, which is a continuation of application No. 08/874,476, filed on Jun. 16, 1997, now abandoned.

(30) Foreign Application Priority Data

Jun. 14, 1996 (JP) .................................. 8-153783

(51) Int. Cl.
*H04N 5/262* (2006.01)
*H04N 5/222* (2006.01)
*H04N 5/76* (2006.01)

(52) U.S. Cl. .............................. 348/240.99; 348/333.12

(58) Field of Classification Search ........... 348/231.99, 348/240.1, 240.2, 240.3, 240.99, 333.02, 348/333.03, 333.11, 333.12; 345/179, 501
See application file for complete search history.

(56) References Cited

U.S. PATENT DOCUMENTS

| | | | |
|---|---|---|---|
| 4,887,161 A | | 12/1989 | Watanabe et al. |
| 5,406,307 A | * | 4/1995 | Hirayama et al. ........... 345/179 |
| 5,414,811 A | * | 5/1995 | Parulski et al. .............. 345/501 |
| 5,497,193 A | | 3/1996 | Mitsuhashi et al. |
| 5,550,754 A | | 8/1996 | McNelley et al. |
| 5,557,328 A | * | 9/1996 | Ishihama et al. ........ 348/240.3 |
| 5,598,209 A | | 1/1997 | Cortjens et al. |
| 5,617,138 A | | 4/1997 | Ito et al. |
| 5,650,819 A | | 7/1997 | Sato et al. |
| 5,689,742 A | | 11/1997 | Chamberlain, IV |
| 5,729,289 A | | 3/1998 | Etoh |
| 5,781,244 A | * | 7/1998 | Hirose et al. ............... 348/561 |
| 5,808,678 A | | 9/1998 | Sakaegi |
| 5,828,406 A | | 10/1998 | Parulski et al. |
| 5,872,922 A | | 2/1999 | Hogan et al. |

(Continued)

FOREIGN PATENT DOCUMENTS

JP    4-356877    12/1992

(Continued)

*Primary Examiner*—Luong T. Nguyen
(74) *Attorney, Agent, or Firm*—Oliff & Berridge, PLC

(57) ABSTRACT

An information processing device includes a shooting lens assembly, a photoelectric conversion element, a memory, a display screen, a zoom designation device and an image size changing device (e.g., a controller). The photoelectric conversion element receives light from an object that is collected by the shooting lens assembly and converts the collected light into electrical signals representative of the object. The memory stores image data that is representative of objects. The display screen displays images of the object corresponding to the electrical signal converted by the photoelectric conversion element or images corresponding to the image data stored in the memory. The image size changing device magnifies or reduces an image size of the image displayed on the display screen regardless of whether the image is being supplied from the photoelectric conversion element or the memory.

10 Claims, 13 Drawing Sheets

U.S. PATENT DOCUMENTS

| | | |
|---|---|---|
| 5,926,218 A | 7/1999 | Smith |
| 5,959,670 A | 9/1999 | Tamura et al. |
| 6,151,070 A | 11/2000 | Sato et al. |
| 6,172,707 B1 | 1/2001 | Ouchi et al. |
| 6,188,432 B1 | 2/2001 | Ejima |
| 6,489,993 B1 * | 12/2002 | Sato et al. ............... 348/240.3 |

FOREIGN PATENT DOCUMENTS

| | | |
|---|---|---|
| JP | 5-244566 | 9/1993 |
| JP | 6-22278 | 1/1994 |
| JP | 6-86131 | 3/1994 |
| JP | 7-95459 | 4/1995 |

* cited by examiner

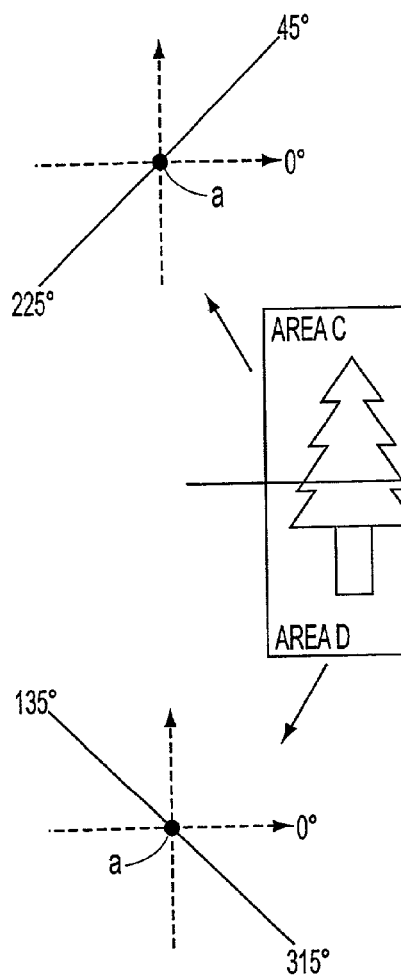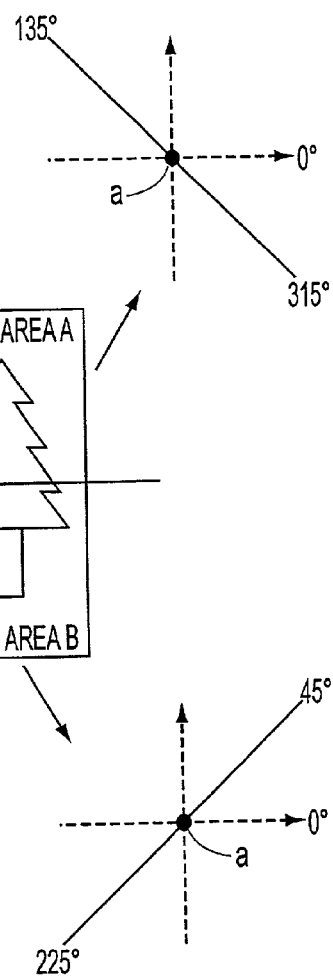
FIG. 14C  FIG. 14A
FIG. 14D  FIG. 14B

DIGITAL CAMERA INCLUDING A ZOOM BUTTON AND/OR A TOUCH TABLET USEABLE FOR PERFORMING A ZOOM OPERATION

INCORPORATION BY REFERENCE

The disclosure of the following priority application is herein incorporated by reference:

Japanese Application No. 08-153783 filed Jun. 14, 1996.

BACKGROUND OF THE INVENTION

1. Field of Invention

The present invention relates to an information processing device. In particular, the present invention relates to an information processing device for taking and displaying pictures electronically, and when displayed, the pictures can be either enlarged or reduced.

2. Description of Related Art

With the progress of electronic circuits, electronic cameras have become widespread which use photoelectric conversion elements to electrically process picture images.

Such electronic cameras often have a liquid crystal display (LCD). The LCD, referred to as an electronic viewfinder, is used for displaying the picture images and provides real-time picture images of the objects or subjects being photographed by the user at the time of taking the picture which will be referred to hereinafter as "shooting the object".

FIGS. 15 and 16 show an example of a conventional electronic camera 81. In the electronic camera 81, light from the object that enters through a shooting lens 101 is converted into electrical signals by a photoelectric conversion element (not shown in the figure) and the electrical signals are digitized to create image data.

Then, by displaying the image data on a LCD 106, the user can confirm the object being photographed.

When a release switch 102 is pressed by the user, an image of the object at that time is taken, i.e., shot, and image data corresponding to the image is stored in a built-in memory (not shown in the figure).

In addition, operating a focal length changing switch 107 changes the focal length of the shooting lens 101, for example, between either a "NORMAL" mode or a "TELEPHOTO" mode. When the focal length changing switch 107 is switched to the "TELEPHOTO" mode, the shooting lens 101 is adjusted so that the focal length becomes longer, and the image of the object becomes larger than the image in the "NORMAL" mode and is displayed on the LCD 106. In such manner, images of the object can be shot in either the "NORMAL" or "TELEPHOTO" modes.

In addition, by operating a specified operating button (not shown), an image, shown by example in FIG. 17, that has been previously taken can be retrieved from storage in the memory and displayed on the LCD 106. Now, the image displayed on the LCD 106 (FIG. 17) can be enlarged as shown in FIG. 18 by pressing a zoom button 105.

Moreover, if a minus (−) switch 103 is pressed while the image in FIG. 18 is being displayed, an enlarged left-side of the image in FIG. 17 is displayed as shown in FIG. 19. Conversely, if a plus (+) switch 104 is pressed while the image in FIG. 18 is being displayed, an enlarged right side of the image in FIG. 17 is displayed as shown in FIG. 20.

Furthermore, by pressing the zoom button 105 again while the image in either FIGS. 18–20 is being displayed, the image reduced to its original size as shown in FIG. 17 is displayed.

As described above, the focal length can be changed at the time of shooting the object by operating the focal length changing switch 107. Thus, the object is displayed as enlarged on the LCD 106. In addition, when displaying images retrieved from the memory i.e., the recorded images, operating the zoom button 105 enlarges the image displayed on the LCD 106.

However, for the similar operations to enlarge the image displayed in the LCD 106, the focal length changing switch 107 is used at the time of shooting images and the zoom button 105 is used at the time of displaying the images retrieved from the memory. Therefore, a problem arises in that the user can be easily confused by these operations. Thus, the user can easily misuse the electronic camera, e.g., by pressing the wrong button.

Moreover, due to providing two operating components, i.e., the zoom button 105 and the focal length changing switch 107, as described above, another problem is that the number of operating components is increased. As a result, the external appearance of the device is tainted.

SUMMARY OF THE INVENTION

It is an object of embodiments of the present invention to either perform a zoom operation (either by changing the focal length of the shooting lens or by performing an electronic zoom) when shooting an image or to perform a zoom operation that changes the magnification of the image on the LCD when displaying a previously recorded image by operating only one component. This results in a reduction of misuse without increasing the number of operating parts.

The information processing device of embodiments of the present invention includes light collecting means for collecting light from an object or subject, photoelectric conversion means for receiving light from the object collected by the light collecting means and for converting the received light into electrical signals, memory means for storing specified image data and display means for displaying images of the object corresponding to the electrical signals converted by the photoelectric conversion means or corresponding to specified image data recorded in the memory means. The information processing device also includes actuating means and zooming (e.g., enlarging/reducing) means. The actuating means is operated at a time to perform a zoom operation with respect to the image projected by the light collecting means on the photoelectric conversion means and also operates when displaying images corresponding to the image data recorded in the memory means, on the displaying means by enlarging or reducing (i.e, zooming) the images. The zooming means enlarges or reduces the image on the display, in response to actuating the actuating means, regardless of whether that image is being provided from the memory means or from the photoelectric conversion means.

In the information processing device of the present invention, when the actuating means is actuated at the time of shooting the object, the focal length of the light collecting means is changed. (Alternatively, the device can perform a digital zoom operation in which the focal length of the light collecting means remains fixed, but the image provided from the photoelectric conversion means is electronically enlarged or reduced, e.g., by interpolation or thinning.) Also, when the actuating means is actuated at the time of displaying the image corresponding to the image data recorded in the memory means, the image displayed on the display means is either enlarged or reduced. Therefore, misuse of the information processing device of the present invention can be reduced and the number of operating components can be reduced as well.

BRIEF DESCRIPTION OF THE DRAWINGS

FIG. 5 is a diagram representing a 2×2 pixel area when the information processing device of the present invention is in a "L" mode;

FIG. 6 is a diagram representing a 3×3 pixel area when the information processing device of the present invention is in a "H" mode;

FIG. 14 illustrates another point-and-drag system for enlarging and reducing the image;

DETAILED DESCRIPTION OF PREFERRED EMBODIMENTS

An information processing device of the present invention is explained hereinafter with reference to the above-described figures.

Figure 1:
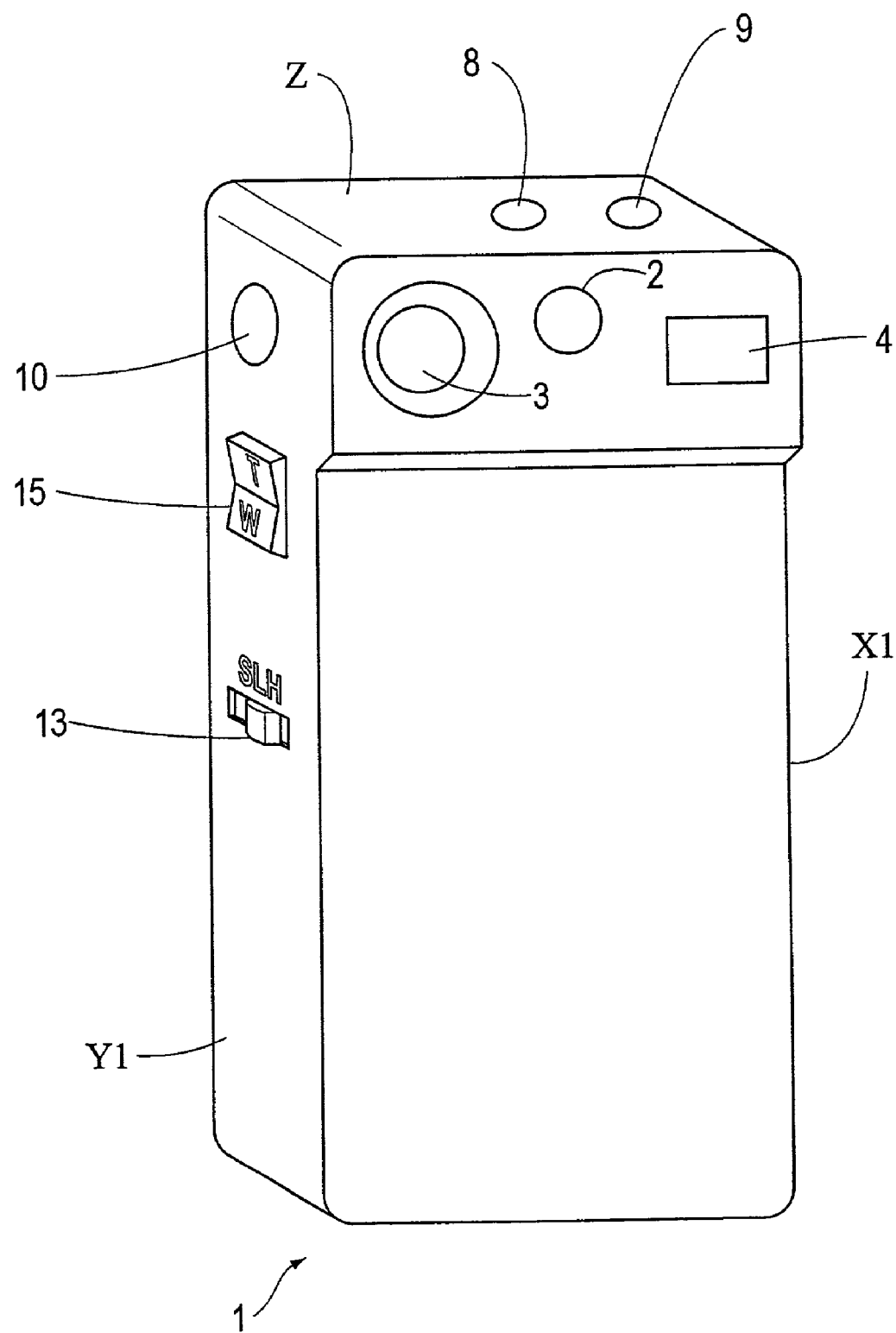
FIG. 1 is a front perspective view showing an information processing device of the present invention.
Figure 2:
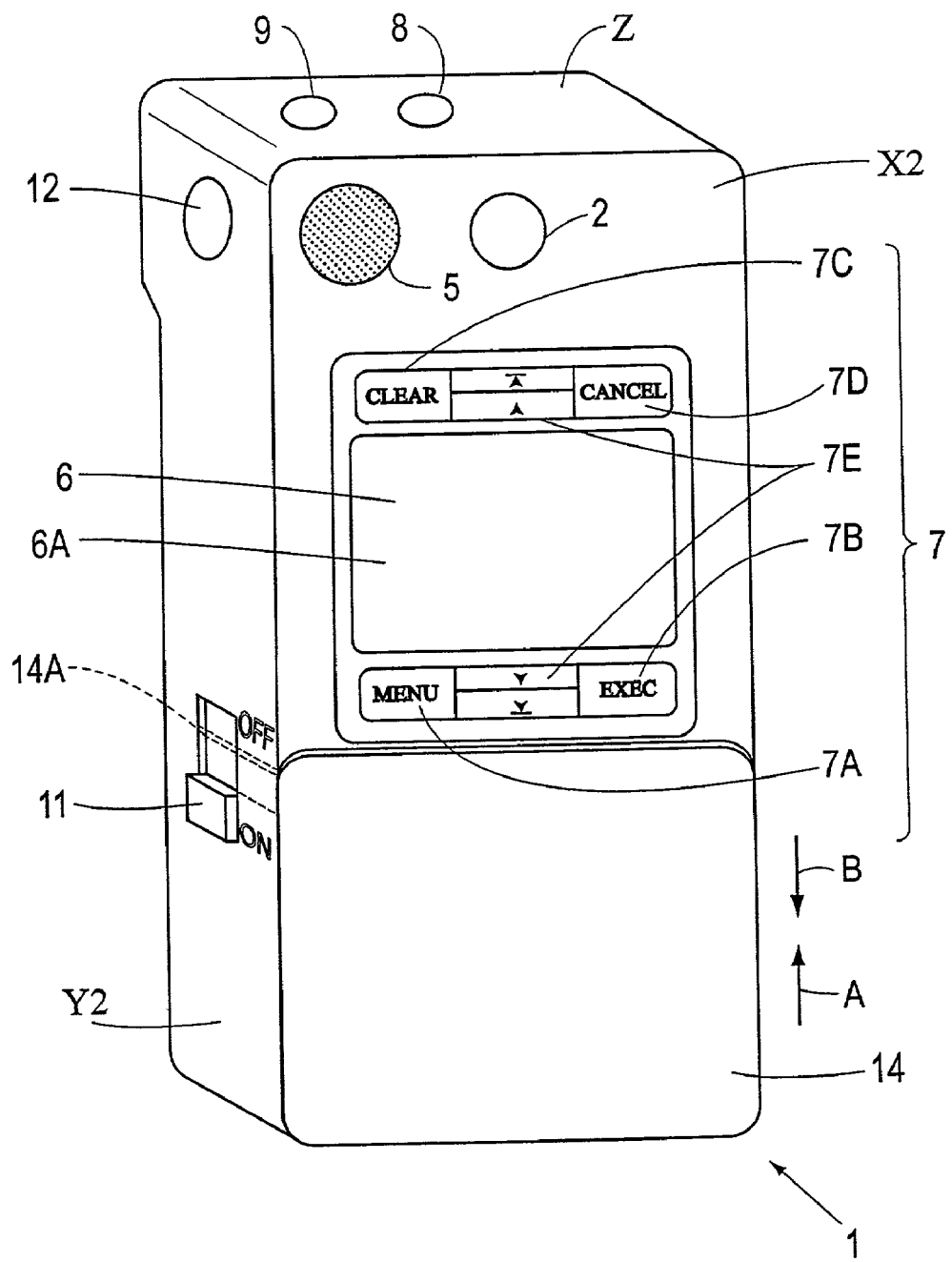
FIG. 2 is a rear perspective view showing the information processing device of the present invention shown in FIG. 1.

FIGS. 1 and 2 are perspective views showing an electronic camera 1, which is one embodiment of an information processing device of the present invention. In the electronic camera 1 of the present invention, a side facing an object when shooting a picture, i.e., taking a picture, of the object is designated as a front face X1, and a side facing a user is designated as a rear face X2. On an upper section of the front face X1, a viewfinder 2 used for confirming the scope of shooting the object, light collecting means in a form of a shooting lens 3 that receives an optical image of the object and a strobe or flash 4, that emits light to illuminate the object, are provided.

Figure 4:
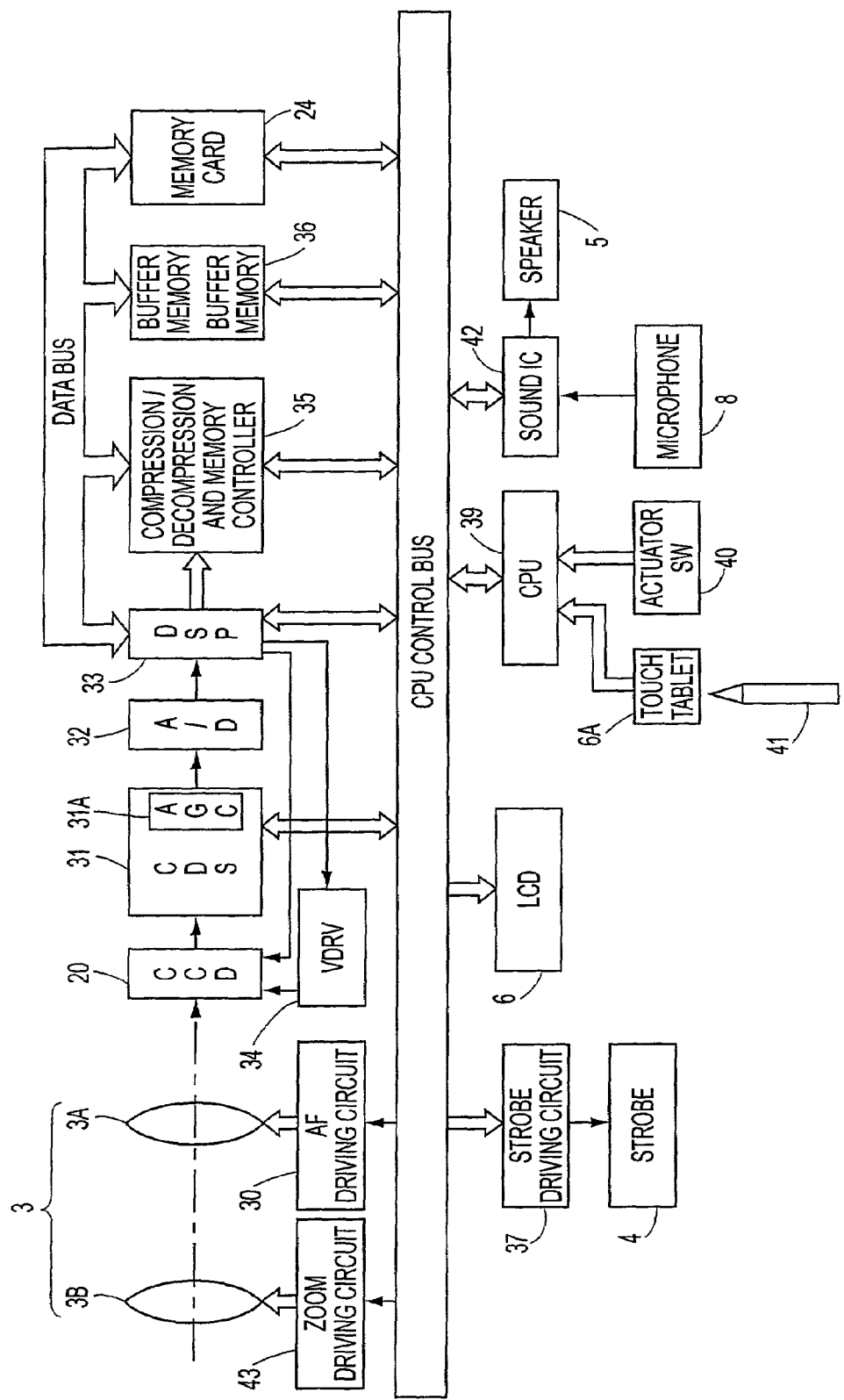
FIG. 4 is a block diagram showing an electrical structure of the information processing device of the present invention shown in FIGS. 1 and 2.

On an upper portion of the rear face X2, the viewfinder 2 and a speaker 5, that outputs sounds recorded by the electronic camera 1, are provided. In addition, display means in a form of an LCD 6 is disposed on the rear face X2 and operation keys 7 are positioned below the viewfinder 2 and the speaker 5. A touch tablet 6A is arranged to cover a surface of the LCD 6. The touch tablet 6A outputs positional data that corresponds to a pointed position which is made by contacting the touch tablet 6A with a pen-type pointing member 41 as shown in FIG. 4.

The touch tablet 6A is fabricated of a transparent material, such as glass or resin, and the user can observe through the touch tablet 6A the image displayed on the LCD 6 disposed behind the touch tablet 6A.

The operation keys 7 are keys that are operated when previously recorded images are to be displayed on the LCD 6. The user supplies electrical signals through the operation keys 7 which are detected by a CPU 39 (FIG. 4).

A menu key 7A among the operation keys 7 is for displaying a menu screen on the LCD 6. An execution key 7B is activated for displaying previously recorded information which is selected by the user.

A clear key 7C is activated for deleting the previously recorded information. A cancel key 7D is activated for canceling, i.e., terminating, the display of the previously recorded information. A scroll key 7E is activated for scrolling the screen in upward and downward directions after a list of the recorded information is displayed on the LCD 6.

On the rear face X2, a slidable LCD cover 14 is provided which protects the LCD 6 when the LCD 6 is not in use. The LCD cover 14 covers the LCD 6 as well as the touch tablet 6A when the LCD cover 14 is moved in an upward direction shown by arrow A. In addition, when the LCD cover 14 is moved in the downward direction shown by arrow B, the LCD 6 and the touch tablet 6A appear. A power switch 11 positioned on a second side Y2, as shown in FIG. 2, is switched to an ON state by an arm 14A of the LCD cover 14.

On a top side Z of the electronic camera 1, shown in FIG. 2, a microphone 8, that collects sound, and an earphone jack 9, to which a conventional earphone (not shown) can be connected, are provided.

On a first side Y1, shown in FIG. 1, a release switch 10, a zoom button 15 and a continuous shooting mode changing switch 13 are provided. The release switch 10 is activated when shooting the object. Actuating means in the form of the zoom button 15 is activated when changing a focal length of the shooting lens 3 when shooting the object. Zoom button 15 also is operated when changing magnification of the displayed image when displaying a previously recorded image. As used herein, "zoom" refers to a process in which the image is either enlarged or reduced. Zooming can be accomplished mechanically (for example, by driving a lens system to change the focal length of a shooting lens) or electronically (for example, by interpolation or thinning, i.e., data manipulation), which sometimes is referred to as "digital zoom." The continuous shooting mode changing switch 13 is activated to change shooting modes before shooting the object. The zoom button 15 and the continuous shooting mode changing switch 13 are arranged below the viewfinder 2, shooting lens 3 and strobe 4 which are provided on the upper section of the front face X1.

On the second side Y2, shown in FIG. 2, a sound recording switch 12, for activation when recording sounds, and the power switch 11 are provided. The power switch 11 is arranged below the viewfinder 2, the shooting lens 3 and the strobe 4 which are provided on the upper part of the front face X1, similarly to the above described release switch 10 and power switch 11. In addition, the sound recording switch 12 is positioned on the second side Y2 at substantially the same height as the release switch 10 on the first side Y1 to facilitate their use when the electronic camera is held by either the user's right hand or the left hand.

The respective heights of the release switch 10 and the sound recording switch 12 can be different so that when one of the switches is pressed by the user's finger, the other switch is not accidentally pressed.

The continuous shooting mode switch 13 is used when setting whether the image is to be shot for just one frame or for a specified plurality of frames when the user presses the release switch 10. For example, when the release switch 10 is pressed and the continuous shooting mode switch 13 is in a position labeled as "S" (i.e., a "S" mode), only one frame of picture is shot.

In addition, if the release switch 10 is pressed when the continuous shooting mode switch 13 is in a position labeled as "L" (i.e., a "L" mode), shooting is accomplished at a rate of 8 frames per second while the release button is being pressed. In other words, shooting occurs in a slow, continuous shooting mode.

Moreover, if the release switch 10 is pressed when the continuous shooting mode switch 13 is switched to a position labeled as "H" (i.e., a "H" mode), shooting is accomplished at a rate of 30 frames per second while the release button is being pressed. In other words, shooting occurs in a fast, continuous shooting mode.

The zoom button 15 has two built-in switches normally disposed in an OFF state. One switch moves to the ON state while a section of the zoom button 15 labeled "T" is being pressed. The other switch moves to the ON state while another section of the zoom button 15 labeled "W" is being pressed. When neither of the switches is pressed (i.e., when the zoom button 15 is not activated), the two switches are in the OFF state.

When shooting the object, if the section of the zoom button 15 labeled "T" is pressed, one switch moves to the ON state and, in response, the shooting lens 3 is moved to lengthen the focal length of the shooting lens 3. On the other hand, if the section of the zoom button 15 labeled "W" is pressed when shooting the object, the other switch moves to the ON state and, in response, the shooting lens 3 is moved to shorten the focal length.

By actuating the zoom button 15 in such manner, the focal length of the shooting lens 3 can be continuously changed while shooting the object. Accordingly, by changing the focal length of the shooting lens 3, the magnification of the image of the object displayed on the LCD 6 also changes. The object is displayed as being enlarged if the focal length is lengthened and is displayed as being reduced if the focal length is shortened.

Furthermore, the zoom button 15 can be actuated to enlarge or reduce a previously recorded image being displayed on the LCD 6. While the previously recorded image is being displayed, if the section of the zoom button 15 labeled "T" is pressed, one of the two switches of the zoom button 15 moves to the ON state. In response to the ON state of the switch, the previously recorded image displayed on the LCD 6 is enlarged. On the other hand, by pressing the section of the zoom button 15 labeled "W", the other switch moves to the ON state and in response, the previously recorded image displayed on the LCD 6 is reduced.

Figure 3:
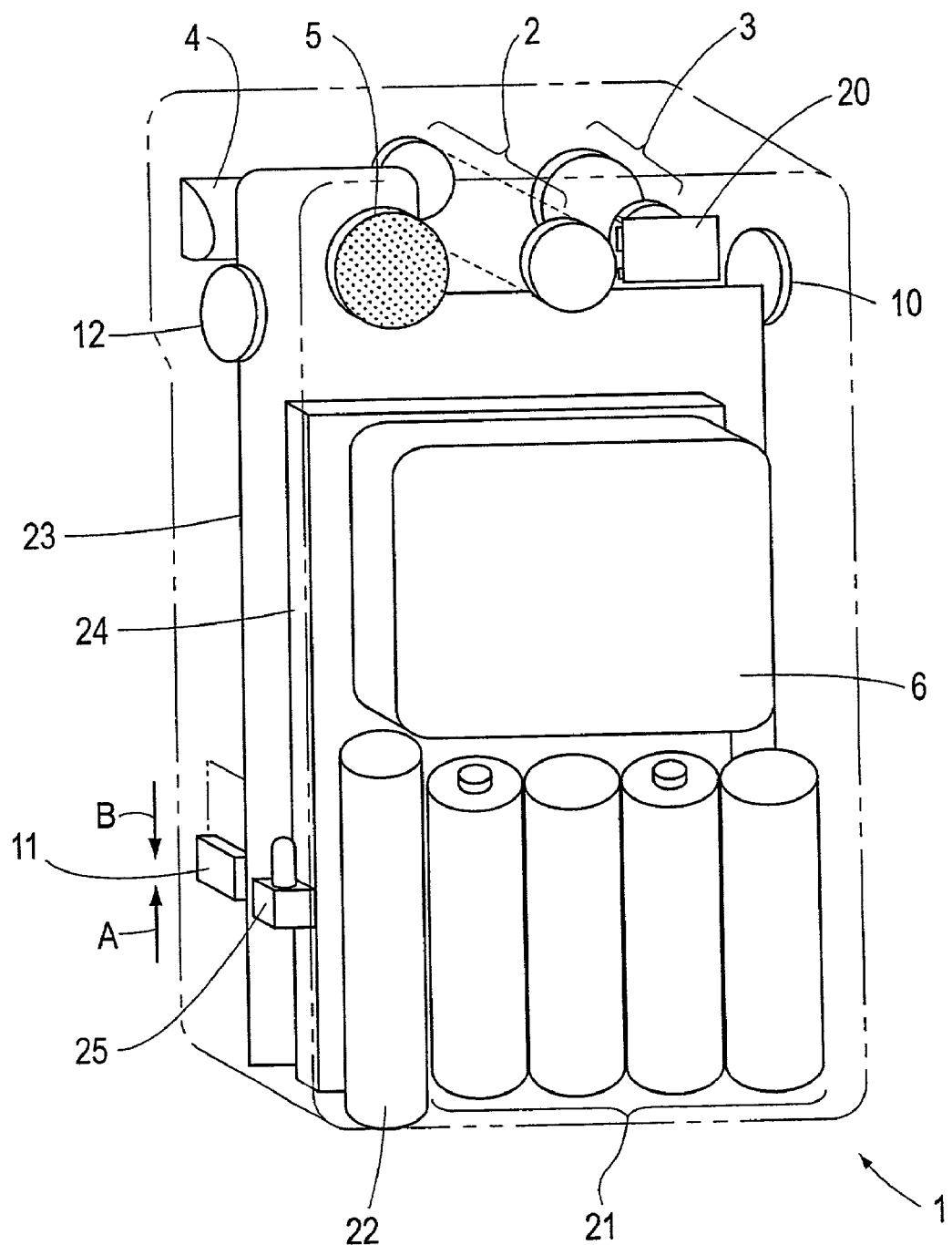
FIG. 3 is a perspective view showing internal components of the information processing device of the present invention shown in FIGS. 1 and 2.

Next, the internal structure of the electronic camera 1 of the present invention is described. FIG. 3 is a perspective view showing, by way of example, the internal structure of the electronic camera shown in FIGS. 1 and 2. Photoelectric conversion means in the form of a CCD 20 is provided on a rear portion of the shooting lens 3 and constructed to photoelectrically convert the optical image of the object formed through the shooting lens into corresponding electronic image signals. Other types of photoelectric conversion devices can be used in place of the CCD 20.

Below the LCD 6, four cylinder-shaped batteries 21, such as AA dry cells, are disposed within the electronic camera 1 and supply electricity to appropriate components of the electronic camera 1. Also, below the LCD 6, a condenser 22 accumulates the electric charge needed for the strobe or flash 4 to emit light and is arranged juxtaposed the batteries 21.

Various control circuits that control each part of the electronic camera 1 of the present invention are formed on a circuit board 23. In addition, among the circuit board 23, the LCD 6 and batteries 21, a memory card or recording medium 24 that can be inserted into or ejected from the electronic camera 1 is provided. Various types of information to be input to the electronic camera 1 can be recorded on the memory card 24.

Moreover, an LCD switch 25 arranged adjacent to the power switch 11 moves to the ON state only while a protruding part of the LCD switch 25 is being pressed. When the LCD cover 14 is moved in the downward direction "B", the LCD switch 25 is switched to the ON state by the arm 14A of the LCD cover 14.

When the LCD cover 14 is moved in the upward direction "A", the power switch 11 can be operated by the user independently from the LCD switch 25. While both the power switch 11 and the LCD switch 25 are in the ON state, electricity is supplied to power the LCD 6. On the other hand, when the LCD switch 25 is in the OFF state, i.e., when the LCD cover 14 is closed, the LCD switch 25 is in the OFF state. At this time, if the power switch 11 is in the ON state, electricity is supplied to power other circuits.

In addition, the memory card 24 is insertable into and ejectable from the electronic camera 1. However, a permanent memory device can be provided on the circuit board 23 and various types of information can be recorded on the permanent memory device. It is also possible to output the various types of information recorded in the permanent memory device or the memory card 24 to an external personal computer or the like through an interface (not shown).

Next, an example of an electrical structure contained inside the electronic camera 1 is described with reference to a block diagram shown in FIG. 4. The CCD 20 that includes a plurality of pixels photoelectrically converts an optical image formed on each pixel into electrical image signals. A digital signal processor 33 (referred hereafter as DSP) supplies horizontal-CCD driving pulses to CCD 20 and controls a CCD driving circuit 34 (VDRV) to supply vertical-CCD driving pulses to the CCD 20.

A correlated double sampling circuit 31 (referred hereinafter as CDS) is controlled by the CPU 39 and samples the electrical image signals that the CCD 20 photoelectrically converts. Then, the sampled signals are amplified to a predetermined level with an automatic gain control circuit 31A (referred hereinafter as AGC). An analog/digital converting circuit 32 (referred hereinafter as A/D converting circuit) digitizes the signals sampled at the CDS 31 and supplies them to the DSP 33.

A compression/decompression circuit and memory controller 35 controls a data bus that interconnects the DSP 33, a buffer memory 36 and the memory card 24. The electrical image signals supplied to the DSP 33 are temporarily stored in appropriate data areas, which are described in detail below, of the buffer memory 36. The image data stored in the data area of the buffer memory 36 is read, and after compressing the image data, the compressed image data (referred hereinafter as "shot image data") is recorded in a shot image recording area of the memory card 24.

The buffer memory 36 is divided into a data area and a frame memory area. The data area of the buffer memory 36 is utilized, in addition to temporarily maintaining the data being processed, to reduce differences of input and output speed of data to and from the memory card 24 and processing speed of the CPU 39, DSP 33, or the like. The frame memory area is used as a frame memory that maintains values of each pixel of the LCD 6. A skilled artisan would appreciate that the data area could be a plurality of data areas and that the frame memory area could be a plurality of frame memory areas. Further, other areas described herein can be construed as singular or plural.

The compression/decompression circuit and memory controller 35 stores the image data supplied to the DSP 33 into the frame memory area of the buffer memory 36 and displays the image data on the LCD 6. Then, after reading the shot image data from the memory card 24 and decompressing the shot image data, the compression/decompression circuit and memory controller 35 stores the decompressed image data in the frame memory area of the buffer memory 36 and also displays the decompressed image data on the LCD 6.

Additionally, the compression/decompression circuit and memory controller 35 manages the recording of the data to the memory card 24 and the timing for inputting and outputting data to storing the decompressed data to the buffer memory 36.

In addition, the compression/decompression circuit and memory controller 35 has a built-in timer circuit and backup batteries, which are not shown FIG. 4, for recording date and time information when the images are shot in the shot image recording area of the memory card 24 as header information (i.e. date and time data is added to the shot image data recorded in the shot image recording area of the memory card 24).

The microphone 8 inputs sound information and supplies the sound information to a sound processing circuit 42 (sound IC). The sound IC 42 digitizes the sound information supplied to it and outputs the digitized sound information to the CPU 39.

The CPU 39 records the sound data in a sound recording area of the memory card 24 after temporarily storing it in the data area of buffer memory 36 after the sound data has been digitized and compressed. At this time, the data indicating the recording date and time is recorded as the header information of the sound data in the sound recording area of the memory card 24.

The sound IC 42 converts the sound data supplied from the CPU 39 into analog signals and the analog sound signals are output to the speaker 5.

Furthermore, when a specified position of the touch tablet 6A is pressed by pen-type pointing member 41 such as a pen or a stylus that the user operates, the CPU 39 reads an X-Y coordinate of the position of the touch tablet 6A that was pressed and accumulates the coordinate data (such as line-drawing information which will be described later) for storage into the data area of the buffer memory 36. In addition, CPU 39 causes the coordinate data accumulated in the buffer memory 36 to be recorded into a line-drawing information recording area of the memory card 24 with header information indicating the date and/or time of the line-drawing information.

The CPU 39 receives and properly processes signals received from various operation switches 40, such as the power switch 11, the zoom button 15 or sound recording switch 12.

The CPU 39 controls a strobe driving circuit 37 to appropriately actuate the strobe or flash 4. In addition, CPU 39 controls an AF driving circuit 30 to move a first lens 3A, that is a component of the shooting lens 3, for automatic focus operations. The CPU 39 also controls a zoom driving circuit 43 in response to the operation of the zoom button 15 to change the focal length of the shooting lens 3 by moving a second lens 3B that is a component of the shooting lens 3.

Moreover, if the image stored in the memory card 24 is being displayed on the LCD 6, the CPU 39 facilitates changes in the magnification of the displayed image displayed by enlarging or reducing the image in response to the operation of the zoom button 15.

For enlarging the image, the CPU 39 creates an enlarged image by interpolating values of pixels of the enlarged image from the values of each pixel of the original image stored in the frame memory area of the buffer memory 36 and stores the enlarged image in the frame memory area. In contrast, for reducing the image, the CPU 39 creates a reduced image by reducing specified pixels from the original image stored in the frame memory area of the buffer memory 36 and stores the reduced image in the frame memory area.

In this case, when the previously recorded image is being displayed, the CPU 39 does not change the focal length of the shooting image 3 even if the zoom button 15 is actuated.

Next, various operations of the electronic camera 1 of the present invention is explained. First, shooting the object using the present invention is described.

An example where the continuous shooting mode changing switch 13 is positioned in the S mode, i.e., the mode that shoots only 1 frame, is explained. First, electricity is supplied to power the electronic camera 1 by switching the power switch 11 shown in FIG. 1 to the "ON" state. Then, shooting the object is commenced when the object is confirmed through the viewfinder 2 and the release switch 10 is pressed.

The optical image of the object observed by the viewfinder 2 is collected by the shooting lens 3 and is formed onto the CCD 20 that has a plurality of pixels. The optical image of the object formed on the CCD 20 is photoelectrically converted to electrical image signals at each pixel and sampled by the CDS 31. The electrical image signals sampled by the CDS 31 are supplied to the A/D converting circuit 32, digitized and output to the DSP 33.

The DSP 33 outputs the image data to the data area of the buffer memory 36. Then, the compression/decompression circuit and memory controller 35 reads the image data from the buffer memory 36 and compresses the image data in accordance with the JPEG (Joint Photographic Experts Group) format in which discrete cosine conversion, quantization and Huffman encoding are combined. Then, the DSP 33 records the image data in the shot image recording area of the memory card 24. At this time, the data indicating the date and/or time of shooting the image is recorded as header information of the shot image data in the shot image data recording area of the memory card 24. Compression techniques other than the JPEG techniques could be used as an alternative.

When the continuous shooting mode changing switch 13 is in the S mode, shooting only one frame is performed, and shooting is not performed thereafter even if the release switch 10 is continuously pressed. Additionally, if the release switch 10 is continuously pressed, the shot image is displayed on the LCD 6.

Second, an example in which the continuous shooting mode switch 13 positioned in the L mode, i.e., the mode that continuously shoots 8 frames in one second, is described. When electricity is supplied to power the electronic camera 1 by switching the power switch 11 to the "ON" state and when the release switch 10 is pressed, shooting of the object is commenced.

Light from the object observed through the viewfinder 2 is collected by the shooting lens 3 and projected onto the CCD 20. The optical image of the object formed on the CCD 20 is photoelectrically converted to electrical image signals at each pixel sampled by the CDS 31 at rate of 8 times per second. In addition, at this time, the CDS 31 reduces the electric signals of the image corresponding to ¾ (three quarters) of the pixels among the electric signals of the pixels from the CCD 20.

Figures 5, 6:
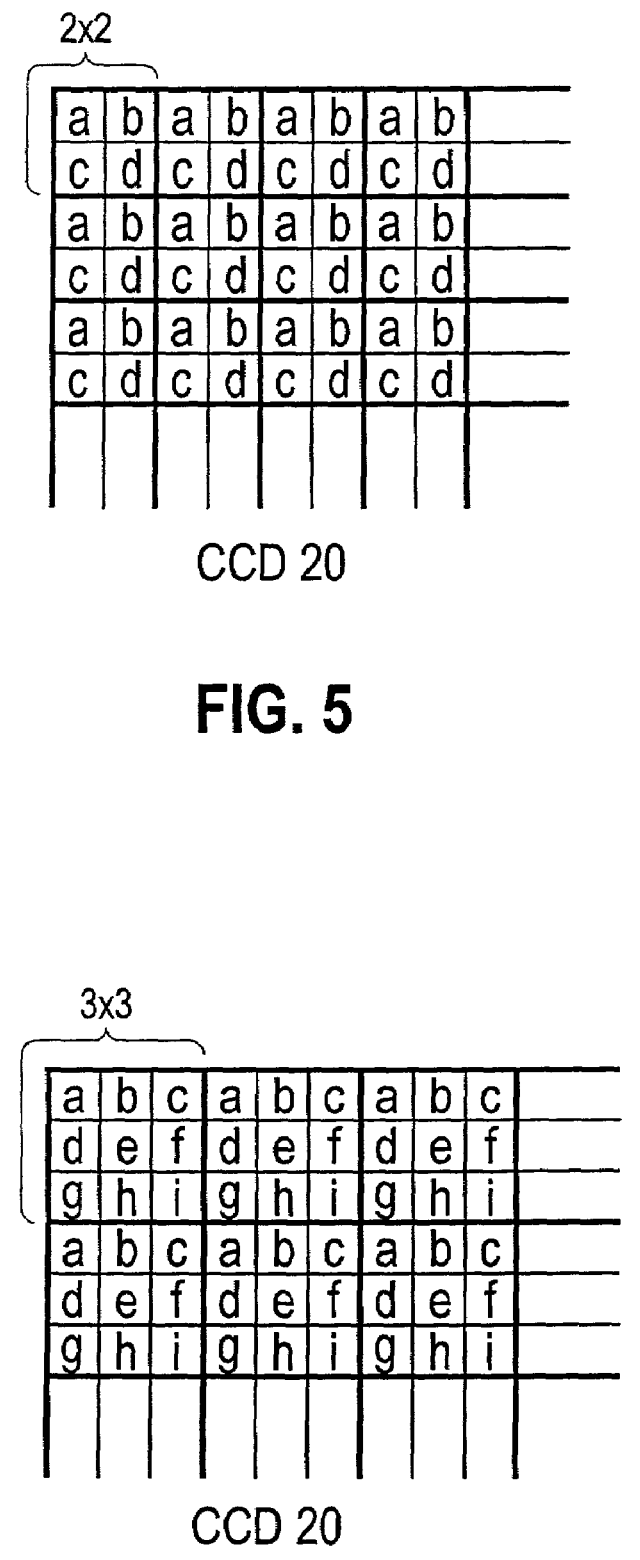

In other words, the CDS 31 divides the pixels of the CCD 20 that are arranged in a shape of a matrix into areas with each area composed of an array of 2×2 pixels (4 pixels) as shown in FIG. 5. Then, an image signal of one pixel located at the specified position is sampled, and the remaining three pixels are skipped.

For example, at the time of a first sampling, a pixel "a" at the left upper position in each area is sampled and the other pixels "b", "c" and "d" are skipped. At the time of a second sampling, the pixel "b" at right upper position in each area is sampled, and the other pixels "a", "c" and "d" are skipped. Thereafter, at the time of the third and fourth samplings, the left lower pixel "c" and the right lower pixel "d" are sampled, respectively, and the other pixels are skipped. That is, each pixel is sampled in every four frames.

The image signals sampled by the CDS 31 (image signals of ¼ (one quarter) of the total pixels of the CCD 20) are supplied to the A/D conversion circuit 32, and output to the DSP 33 as digitized.

The DSP 33 outputs the digitized image signals to the data area of the buffer memory 36 and the compression/decompression circuit and memory controller 35 reads out the image signals and, after compressing the image signals by the JPEG method, records the digitized and compressed shot image data in the shot image recording area of the memory card 24. At this time, date and time are recorded as the header information of the shot image data in the shot image recording area of the memory card 24.

Third, an example in which the continuous shooting mode changing switch 13 is positioned in the H mode, i.e., the mode in which 30 frames of images are continuously shot in one second, is explained. After the power is supplied to power the electronic camera 1 by switching the power switch 11 to the "ON" state and when the release switch 10 is pressed, shooting of the object is started.

Light from the object observed through the viewfinder 2 is collected by the shooting lens 3 and projected onto the CCD 20. The optical image of the object formed on the CCD 20 is photoelectrically converted to electrical image signals at each pixel and sampled by the CDS 31 at a rate of 30 times per second. In addition, at this time, the CDS 31 reduces the electrical signals of the images that correspond to ⁸⁄₉ (eight/ninths) of the pixels among the electric signals of the image from the CCD 20.

In other words, the CDS 31 divides the pixels of the CCD 20 arranged in a matrix shape into individual areas, each of which is composed of 3×3 pixels as shown in FIG. 6. Then, the electrical image signals of one pixel which is arranged at a specified position within each matrix are sampled at a rate of 30 times per second and the remaining eight pixels are skipped.

For example, at the first sampling, the left upper pixel "a" in each area is sampled, and the other pixels "b" to "i" are skipped. Then, at the second sampling, the pixel "b" arranged to the right of the pixel "a" is sampled, and the other pixel "a" and pixels "c" to "i" are skipped. Thereafter, at the sampling after a third time, each of pixels "c" through "i" is sampled, and the other pixels are skipped. That is, each pixel is sampled every 9 frames.

The image signals sampled by the CDS 31 (image signals of pixels that are ⅑ of the total pixels of the CCD 20) are supplied to the A/D converter circuit 32, at which the image signals are digitized and output to the DSP 33.

The DSP 33 outputs the digitized image signals to the data area of the buffer memory 36. The compression/decompression circuit and memory controller 35 reads the image signals and, after compressing the image data in accordance with the JPEG method, records the digitized and compressed shot image data in the shot image recording area of the memory card 24 with the header information containing the shot date and/or time.

In addition, the strobe 4 can be operated to illuminate light to the object, if necessary.

Next, operations for inputting two-dimensional pen input information using the touch tablet 6A are explained.

When the touch tablet 6A is pressed with a tip of the pen-type pointing member 41 (hereinafter referred to as pen), an X-Y coordinate of the contacted location is input into the CPU 39. The X-Y coordinate is recorded in the data area of the buffer memory 36. In addition, data can be written at locations corresponding to each point of the X-Y coordinates in the frame memory area of the buffer memory 36 to display a line-drawing on the LCD 6 corresponding to the contact points made by the pen 41 onto the touch tablet 6A.

As described above, because the touch tablet 6A is fabricated from a transparent material, the user can observe on the LCD 6 the point at a location pressed by the tip of the pen 41 so that the user feels as if the user directly input the point using the pen 41 on the LCD 6. Moreover, if the pen 41 is moved on the touch tablet 6A, a line according to the movement of the pen 41 is displayed on the LCD 6. Furthermore, if the pen 41 is intermittently moved on the touch tablet 6A, a broken line is displayed on the LCD 6. As described above, the user can input desired line-drawing information, such as characters and figures, on the touch tablet 6A for display on the LCD 6.

In addition, if the line-drawing information is input by the pen 41 when an image is displayed on the LCD 6, the line-drawing information includes the shot image information in the frame memory area of the buffer memory 37 and is simultaneously displayed on the LCD 6.

The user can select colors, such as black, white, red or blue, of the line-drawing information displayed on the LCD 6 by controlling a color selection switch (not shown).

After inputting the line-drawing information to the touch tablet 6A by the pen 41 and when the execution key 7B of the operation keys 7 is pressed, the line-drawing information accumulated in the data area of the buffer memory 36 is supplied to the memory card 24 with the header information of the input date (and/or time) and recorded in line-drawing information recording area of the memory card 24.

In addition, the line-drawing information that is recorded in the memory card 24 can be compressed. Because the line-drawing information input to the touch tablet 6A includes information having a high spatial frequency, if the JPEG compression method were to be used, the compression efficiency would not be satisfactory. Moreover, the time required for compressing and decompressing the information is long. In addition, compression using the JPEG method is irreversible and is thus not appropriate for compressing small amounts of line-drawing information. This is because when the data is decompressed and displayed on the LCD 6, imperfections such as gathering, blurring and the like become prominent.

In the present embodiment, the line-drawing information is compressed by a run-length method that is used in facsimile machines and the like. The run-length method is a method which compresses the line-drawing information by horizontally scanning the line-drawing screen and coding continuous lengths of information, i.e., points, in each color, such as black, white, red and blue, and continuous lengths where there is no pen input.

By using this run-length method, the line-drawing information is compressed to a minimum, and even when the compressed line-drawing information is decompressed, imperfections of information can be reduced. In addition, when the amount of line-drawing information is relatively small, it can be designated that the line-drawing information is not to be compressed.

Moreover, as described above, when the shot image is displayed on the LCD 6 and if the pen input is executed, the shot image data and the line-drawing information input by the pen 41 are combined in the frame memory area of the buffer memory 36, and the combined image of the shot image and line-drawing is displayed on the LCD 6. On the other hand, in the memory card 24, the shot image data is recorded in the shot image recording areas and the line-drawing information is recorded in the line-drawing information recording area. As described, because two sets of information can be separately recorded in different areas, the user can delete any one of the images from the combined image of the shot image and line-drawing. In addition, each image data can be compressed by different compression methods.

Figure 7:
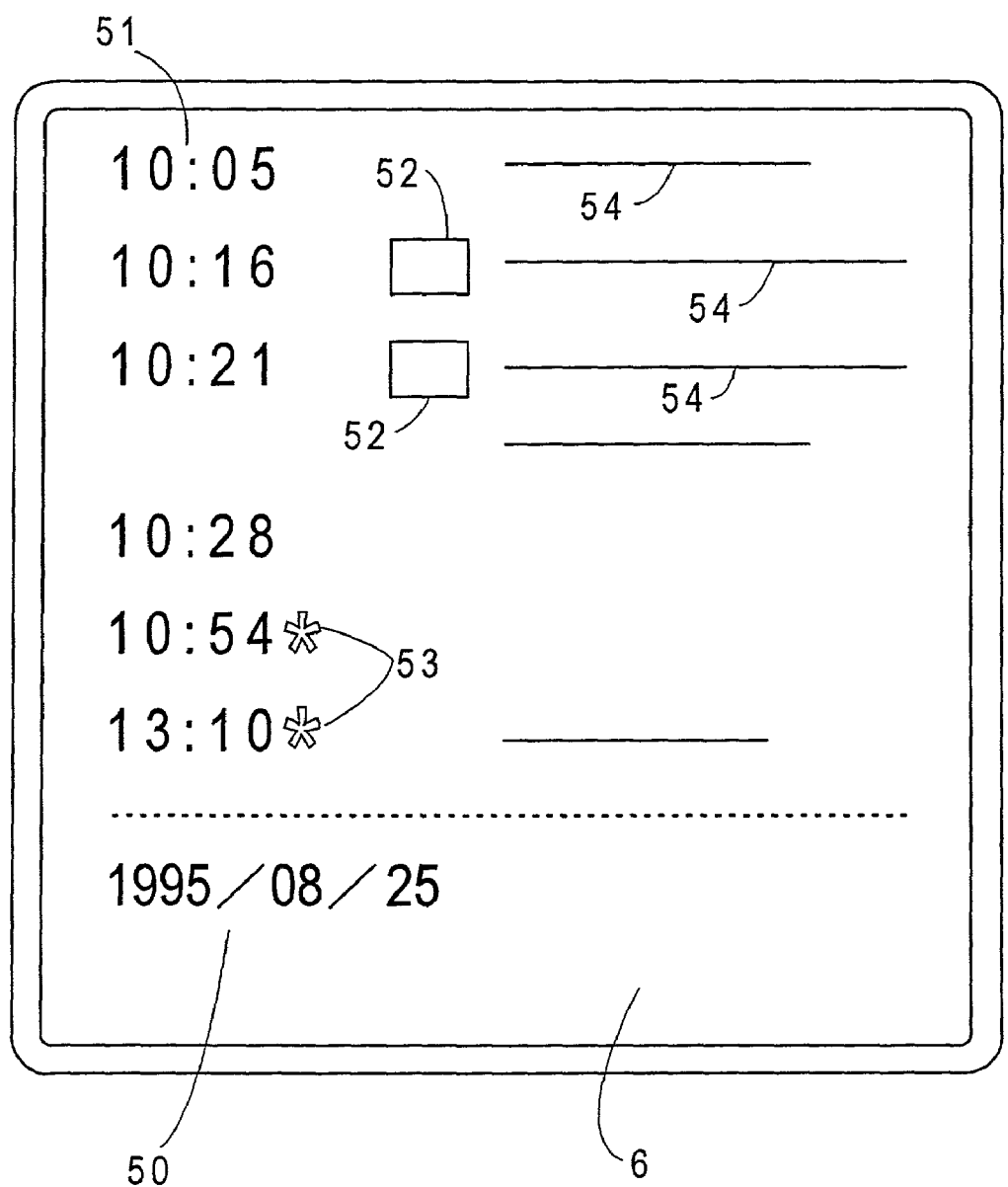
FIG. 7 illustrates a display screen of the information processing device of the present invention shown in FIGS. 1 and 2.

When data is recorded in the sound recording area, shot image recording area, and/or line-drawing information recording area in the memory card 24, a specified display can be performed on the LCD 6 as shown in FIG. 7.

On the display screen of the LCD 6 shown in FIG. 7, recording date information 50 which, in this case, is Aug. 25, 1995, is displayed in a lower part of the screen and recording time information 51, such as 10:05, is displayed at a leftmost portion of the display screen.

On a right side of the recording time information 51, thumbnail images 52 are displayed. The thumbnail images 52 are minimized images of the shot image data recorded in the memory card 24 which were created by reducing bitmap data of each image data. Therefore, the information with such display is information that includes shot image files. That is, image information is included in the information recorded at "10:16" and "10:21," and no image information is included in the information recorded at "10:05", "10:28", "10:54" or "13:10."

Moreover, a memo symbol 53 is shown as an "*" and indicates that a predetermined memo is recorded as line-drawing information.

Furthermore, on the right of the display areas of the thumbnail images 52, sound information bars 54 are horizontally displayed. Each of the bars has a specified length corresponding to a length of time associated with the sound recording. When no sound information is recorded, a sound information bar does not appear.

The user selects and designates the information on the LCD 6 shown in FIG. 7 to be displayed by pressing any portion of the displayed line of the desired information with the tip of the pen 41. The selected information is displayed (or played in the event the sound information bar is selected) by pressing the execution key 7B shown in FIG. 2, preferably with the tip of the pen 41.

For instance, when the line located next to "10:05" shown in FIG. 7 is pressed by the pen 41, the CPU 39 reads the sound data corresponding to the selected recording time, i.e., 10:05, from the memory card 24 and supplies it to the sound processing circuit 42 after decompressing the sound data. The sound processing circuit 42 plays the sound through the speaker 5 after converting the supplied sound data into analog signals.

When the shot image data recorded in the memory card 24 is displayed, the user selects the information of the shot image data by pressing a desired thumbnail image with the tip of the pen 41 and then the selected information is displayed by pressing the execution key 7B.

The CPU 39 instructs the compression/decompression circuit and memory controller 35 to read the shot image data corresponding to the selected shot data from the memory card 24. Then, the compression/decompression circuit and memory controller 35 decompresses the compressed shot image data from the memory card 24, stores the shot image data in the frame memory area of the buffer memory 36 as bitmap data, and displays the shot image data on the LCD 6.

The images shot in the S mode are displayed on the LCD 6 as still images. Therefore, these still images are images in which image signals of the total number of pixels of the CCD 20 are displayed.

The images shot at the L mode are continuously displayed on the LCD 6 at a rate of 8 frames per second. At this time, the number of pixels displayed in each frame is ¼ of the total number of pixels of the CCD 20.

Normally, because human eyes sensitively react to degradation of resolutions of still images, reducing the pixels of still images can be noticed by the user as a degradation of picture quality. However, when the speed of the continuous shooting of the images increases, and when the images which are shot at the rate of 8 frames per second at the L mode and played on the LCD 6 at the rate of 8 frames per second, even though the number of pixels in each frame is reduced to ¼ of the total number of pixels of the CCD 20, the amount of information which enters the human eye in one second increases twofold compared to still images. This is because human eyes view the images at the rate of 8 frames per second.

In other words, assuming the number of pixels of one frame of the image shot at the S mode as 1, the number of pixels in one frame of the image shot at the L mode becomes ¼. When the image shot at the S mode (still image) is displayed on the LCD 6, the amount of information that enters the human eye in one second is equal to the number of pixels times the number of frames or 1×1. In contrast, when the image shot at the L mode is displayed on the LCD 6, the amount of information that enters the human eye in one second becomes the number of pixels times the number of frames or ¼×8. Thus, twice as much information as the still images enters the human eye. Therefore, the user can view the played images without sensing the degradation of picture quality at the time of playing images even if the number of pixels in one frame is reduced to ¼.

Furthermore, in the present invention, because pixels that are different in each frame are sampled and because the sampled images are displayed on the LCD 6, an "afterimage" effect occurs to the human eyes. Even when ¾ of the pixels per frame are skipped, the user can view the images shot at the L mode displayed on the LCD 6 without sensing the degradation of picture quality.

Moreover, the images shot in the H mode are continuously displayed on the LCD 6 at the rate of 30 frames per second. At this time, although the number of pixels displayed in each frame is ⅛ of the total number of pixels of the CCD 20, the user can view the images shot in the H mode displayed on the LCD 6 without sensing the degradation of picture quality for the same reason as in the L mode.

In the present invention, because the CDS 31 reduces the pixels of the CCD 20 at a level in which the user does not sense the degradation of picture quality at the time of displaying the images previously shot in the L mode or H mode, the load on the compression/decompression circuit and memory controller 35 can be reduced. Thus, the DSP 33 and the compression/decompression circuit and memory controller 35 can be operated at low speed and low power consumption. In addition, by doing this, the electronic camera can be produced at a low cost, and have a low power consumption capability.

If the zoom button 15 is operated while a previously recorded image is being displayed on the LCD 6, the displayed image can be enlarged or reduced. In addition, the magnification of the displayed image can be continuously adjusted in response to the actuation of the zoom button 15.

In the present invention, date and time data is added as header information to each type of information or data that is recorded in the memory card 24, as described above. The user then can select desired information from the date and/or time data displayed on the LCD 6 and then display the data (FIG. 7).

In addition, when a plurality of information such as shot image, sound and line-drawing are input simultaneously, each item of information is recorded separately in specified areas of the memory card 24. However, the header information having the same date and/or time is added to each item of information.

For example, when information A, i.e., shot image, information B, i.e., sound, and information C; i.e., line-drawing, are simultaneously input, each item of the informations A, B and C that are recorded in specified areas of the memory card 24 have the same header information of date and/or time data. Moreover, the header information of information A can be set as the date input data, and the header information of the other items of informations B and C can be set as data that relates to information A.

By accomplishing this, the simultaneously input information is displayed (or played, when sound is previously recorded) at the same time when displaying previously recorded images.

In addition, in the present invention, after recording first information (e.g. shot image), second information (e.g. line-drawing), which is different from the first information, can be recorded while the second information is being added to the first information. As described, if the second information is added to the first information, the second information is input while the first information is being displayed (or played). A detailed explanation of this feature is described hereafter.

For example, if the release switch 10 is pressed to commence shooting the object and when previously recorded sound information that has been recorded in advance is being played, header information of the previously sound recorded information is recorded and added to the shot image data. The shot image data is recorded in the shot image recording area of the memory card 24.

For instance, during a replay of the sound information which was recorded at 10:05 on Aug. 25, 1995, if the shooting is performed after one minute passes from the commencement of playing the sound information (i.e. when the play data is 10:06 on Aug. 25, 1995), the header information at 10:06 on Aug. 25; 1995 can be added to the shot image data which is recorded in the shot image recording areas of the memory card 24. However, either one of these times, i.e., 10:05 or 10:06, can be used as the header information. Each time could be used as a default and the user could select which time is to be used as the default.

Similarly, when the previously recorded sound information is played, and if the line-drawing information is input, the same header information as the header information of the recording date for the sound information is recorded with the line-drawing information in the line-drawing information recording area of the memory card 24.

When the sound information and shot image information which were previously input at the same time are being played and displayed respectively, and if the line-draw information is input, the same header information as the header information of the recording date (and/or time) for the sound information or shot image information is recorded with the line-drawing information in the line-drawing information recording areas of the memory card 24.

If the shot image information is input while the sound information and the line-drawing information which were previously input at the same time are being played and displayed, respectively, the same header information as the header information of the recording date (and/or time) for the sound information or the line-drawing information is recorded with the shot image data in the shot image recording area of the memory card 24.

While the shot image information that was previously input is being played, if the sound information is input, the same header information as the header information of recording date (and time) for the shot image information is recorded with the sound information in the sound information recording area of the memory card 24.

If the line-drawing information is input when the shot image information that was previously input is being played, the same header information as the header information of the recording date (and/or time) for the shot image information is recorded in the line-drawing recording area of the memory card 24.

If the sound information is input when the shot image information and line-drawing information that were previously input are being displayed, the same header information as the header information of the recording date (and/or time) for the shot image information or line-drawing information is recorded with the sound information in the sound recording area of the memory card 24.

If the shot image information is input while the line-drawing information that was previously input is being displayed, the same header information as the header information of the recording date (and/or time) for the line-drawing information is recorded with the shot image information in the shot image recording area of the memory card 24.

If the sound information is input while the line-drawing information that was previously input is being displayed, the same header information as the header information of the recording date (and/or time) for the line-drawing information is recorded with the sound information in the sound recording area of the memory card 24.

As described above, if the second information is input while the first information that was previously recorded is being played/displayed, the recording date for the first information becomes the header information of the second information (hereafter called normal mode). By doing so, even if new information is added later, the relationship between the original information and the additional information can be maintained.

Moreover, in the present invention, when the second information is added to the first information that has been previously recorded, not only the input time of the second information is recorded as the header information of the second information, but also the header information of the first information can be replaced with the header information of the second information (hereafter referred as recording time changing mode). In this case, a mode changing switch for the recording time (not shown in the figures) can be provided to the electronic camera 1 to change the recording time with the selection by the user for changing between the normal mode and recording time changing mode.

For instance, if the user is planning to shoot a specific object at a later time, but if the user records comments of the shot image in advance as the line-drawing information (i.e. the line-drawing information is the first information), the above recording time mode changing switch is switched to the recording time changing mode and the object is shot while displaying the recorded line-drawing information (i.e. the shot image is the second information). Then, the input date of the shot image (second information) is added as the header information to both the line-drawing information (first information) and the shot image (second information).

In addition, priorities can be added to the information to be input, and the header information of the input time can be added to each item of information in response to the priorities.

For example, where the priorities for the shot image, sound information and the line-drawing information are designated as first, second and third, respectively and if the sound information is input while the line-drawing information that has been previously recorded, the header information including the input time of the sound information is added to both line-drawing information and the sound information that are recorded to the memory card 24 because the priority of the sound information is, for example, higher than that of the line-drawing information. In addition, if the shot image is input while the sound information and the line-drawing information are being played and displayed respectively, the header information including the input time of the shot image is added to the line-drawing information, the sound information and the shot image which are recorded in the memory card 24 because the priority of the shot image is higher than that of the other information. These priorities can be set by the user.

Next, recording the sound information while shooting the object is explained.

First, the operation that occurs when the continuous shooting mode changing switch 13 is switched to the S mode (single shooting mode) is described. When the sound recording switch 12 is pressed, the input of the sound information is performed and the header information of the recording starting date and/or time is recorded with the sound information in the sound information recording area of the memory card 24. Then, if the release switch 10 is pressed during the input of the sound information, the object is shot for one frame and the shot image data thereof is recorded in the memory card 24. The header information of the date and/or time, i.e., shot starting time, when the release switch 10 is pressed is added to the shot image data.

On the other hand, if the release button 10 is pressed first, the object is shot for one frame. At this time, the date and/or time of shooting the object is recorded as the header information in the shot image data that is recorded in the memory card 24. Moreover, if the release button 10 is continuously pressed, the shot image is displayed on the LCD 6. Additionally, at this time, if the sound recording switch 12 is pressed, the sound information is inputted. At this time, the date of shooting is added as the header information in the sound data information that is recorded in the sound information recording area of the memory card 24.

Next, the continuous shooting mode changing switch 13 switched to the L mode or the H mode (the continuous shooting modes) is described. When the release switch 10 is pressed first, and then the sound recording switch 12 is pressed, and when the release switch and the sound recording switch 12 are pressed at the same time, the shot image information and the sound information are recorded as follows.

When the continuous shooting mode changing switch 13 is in the L mode, 8 frames of the image are shot in one second, and the header information of the time when each frame is shot is added to the shot image information of each frame that is recorded in the shot image recording area of the memory card 24. Therefore, time with intervals of 0.125 seconds is recorded in the header information of each frame. In addition, at this time, the sound information, although input continuously, is recorded every 0.125 seconds and the header information of the time with the intervals of 0.125 seconds is recorded to the sound information that is recorded in the sound information recording area of the memory card 24, as well.

Similarly, where the continuous shooting mode changing switch 13 is changed to the H mode, shooting of 30 frames per second is performed and the header information of the date on which each frame is shot is added to the shot image data of each frame which is recorded in the shot image recording area of the memory cad 24. Therefore, time with intervals of $1/30$ seconds is recorded to the header information of each frame. In addition, at this time, the sound information, although input continuously, is recorded every $1/30$ of a second, and the header information of time with intervals of $1/30$ seconds is recorded also to the sound information which is recorded to the sound information recording area of the memory card 24.

By accomplishing the above process, when the shot image information or the sound information are edited after recording, if any shot images are deleted, the sound information which has the same header information as that of the shot images can also be deleted.

On the other hand, when the continuous shooting mode changing switch 13 is changed to the L mode or the H mode, and if the sound recording switch 12 is pressed and then the release switch 10 is pressed, the header information is recorded to the memory card 24.

In other words, in this case, the sound information that was recorded when the release switch 10 was pressed is recorded as one file in the sound information recording area of the memory card 24. Thereafter, if the release switch 10 is pressed, the header information of time corresponding to each frame of the shot image information is recorded with the sound information.

As described above, in the electronic camera 1 of the present invention, images, sounds, line-drawing information and the like are recorded. Then, when the zoom button 15 is actuated, the focal length of the shooting lens 3 is changed at the time of shooting objects or subjects, and in response, the magnification of the displayed image changes. Therefore, the magnification of the reproduced image changes at the time of shooting the objects or subjects.

In the above embodiment, by actuating the zoom button 15 at the time of shooting the object, the focal length of the shooting lens 3 is changed to optically change the magnification of the shot images. However, as an alternative, the magnification of the shot image can be electronically (i.e., digitally) changed in response to the actuation of the zoom button 15. This can be done by interpolating (to enlarge) or skipping or thinning (to reduce) the image data-supplied by the CCD 20.

Next, a second embodiment of the electronic camera of the present invention is described.

The second embodiment has the same structure as the first embodiment, which uses the touch tablet 6A and the same operations as the above operations to enlarge or reduce the displayed images, as well as changing the focal length of the shooting lens 3 at the time of shooting the objects. In addition, at the time of displaying the images, portions of the displayed images to be enlarged can be selected by using the touch tablet 6A.

Next, the operations of the second embodiment of the present invention when enlarging or reducing the displayed images by using the touch tablet 6A are described.

Figure 8:
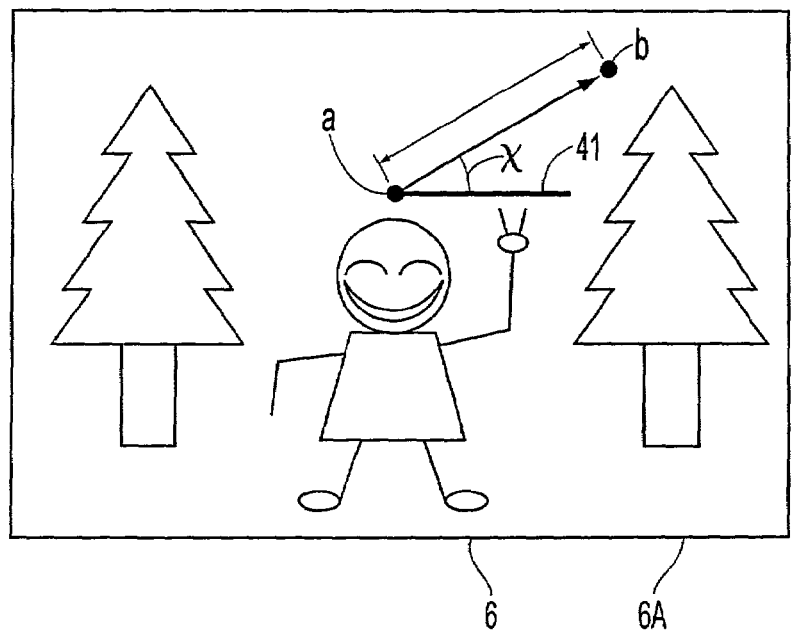
FIG. 8 illustrates the display screen displaying an image in a normal size.

For example, as shown in FIG. 8, the tip of the pen 41 presses on a dragging starting point "a" of the touch tablet 6A disposed over the LCD 6 when a specified image is displayed on the LCD 6. The pen tip is dragged while pressing against touch tablet 6A to a dragging ending point "b".

Figure 9:
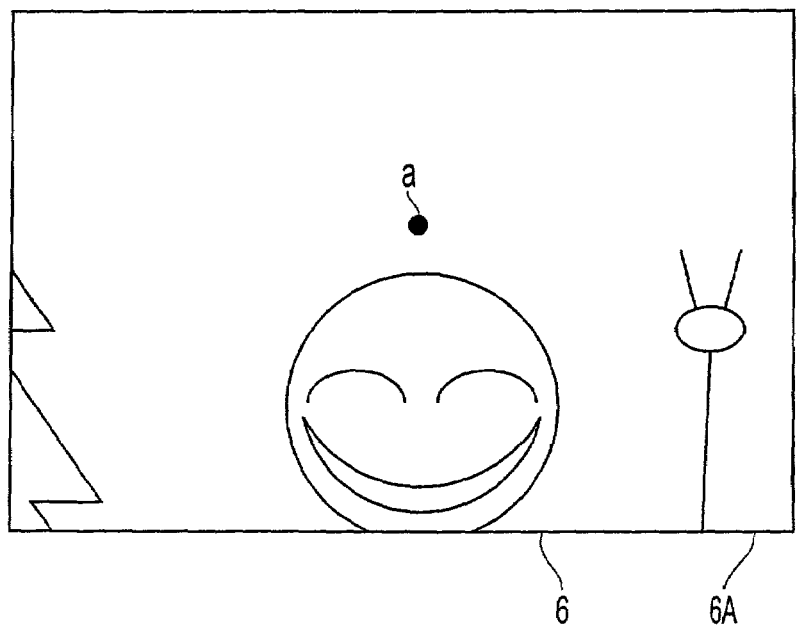
FIG. 9 illustrates the display screen displaying the image in FIG. 8 in an enlarged size.

The CPU 39 receives from the touch tablet 6A a coordinate value of the dragging starting point "a" and the dragging ending point "b" and calculates a distance of dragging from the dragging starting point "a" to the dragging ending point "b" and an angle "x". Angle "x" is an angle formed between an imaginary horizontal line and a straight line formed between the dragging starting point "a" and the dragging ending point "b" as shown in FIG. 8. Then, if angle "x" is within a scope of a table of specified angles stored in the memory card 24, the image is enlarged at a magnification proportional to the distance of the dragging such that the dragging starting point "a" is displayed at the center of the LCD 6 as shown in FIG. 9.

Figure 10:
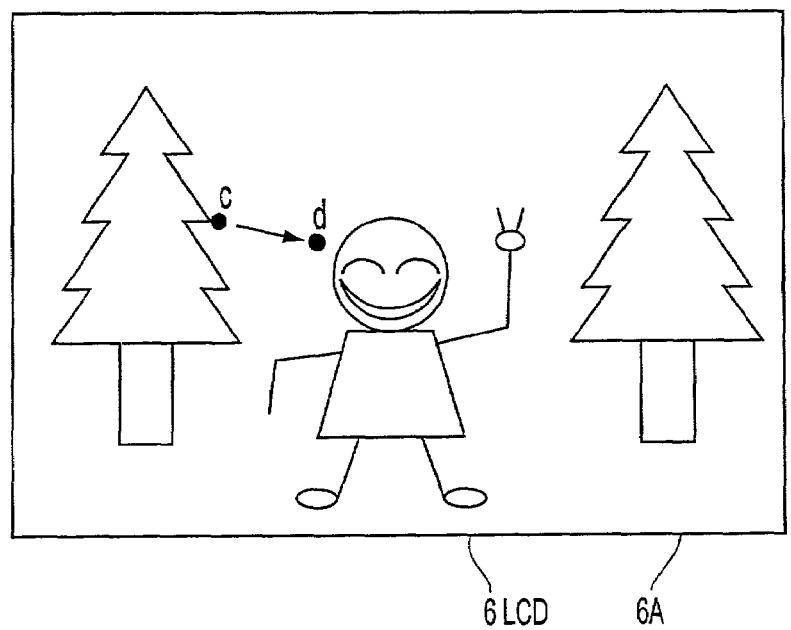
FIG. 10 illustrates the display screen displaying the image in the normal size.
Figure 11:
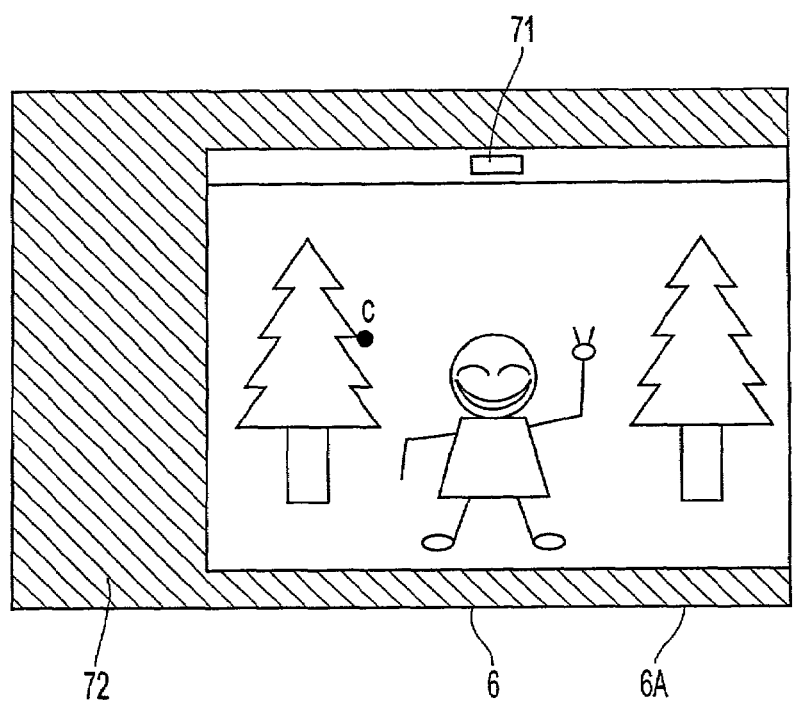
FIG. 11 illustrates the display screen displaying the image in FIG. 10 in a reduced size.

Conversely, as shown in FIG. 10, when the tip of the pen 41 is dragged from a dragging starting point "c" to a dragging ending point "d" towards the center of the LCD 6, the CPU 39 calculates the distance and the angle of the dragging as described above. If the direction of the dragging is within the scope of the specified angles, the image is reduced proportionally to the distance of the dragging length. The dragging starting point "c" is displayed at the center of the LCD 6 as shown in FIG. 11.

Moreover, a preset background 72 is displayed in the margins of the LCD 6 which is created from reducing the image. In addition, when reducing the image, a centering button 71 is displayed on a top portion of the reduced image.

Figure 12:
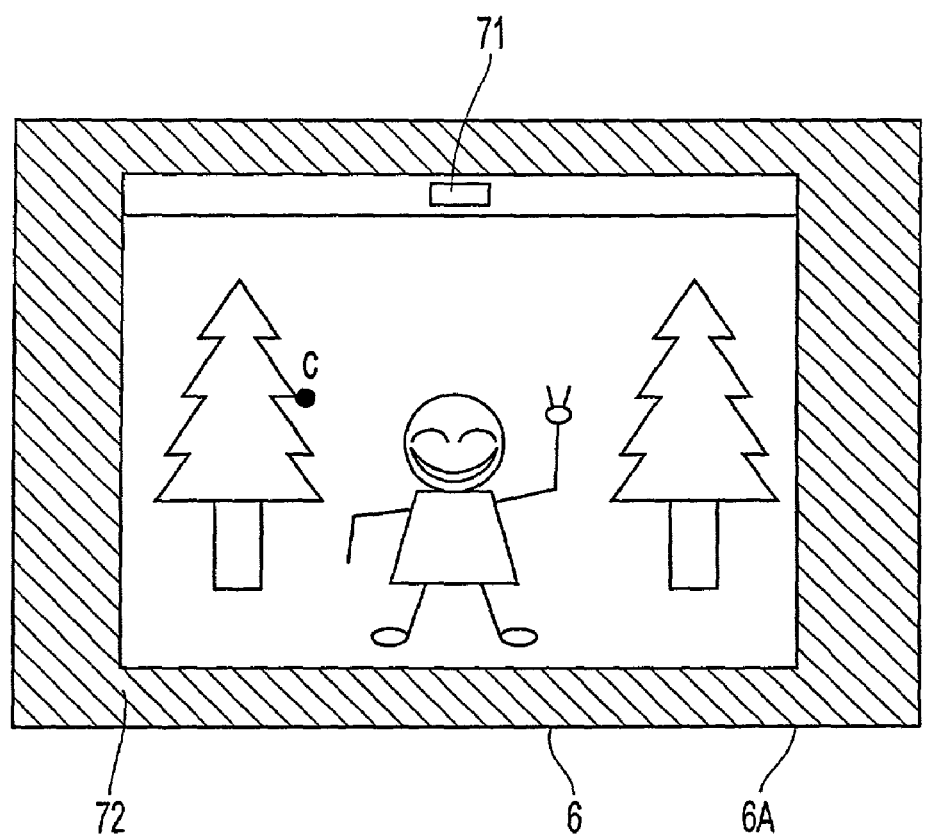
FIG. 12 illustrates the image in FIG. 10 when the reduced image is centrally displayed.

If the button 71 is pressed with the pen 41, the center of the image is repositioned at the center of the LCD 6, and the entire reduced image is displayed substantially centrally of the LCD 6 as shown in FIG. 12.

Next, the corresponding relationships between the direction of the dragging by the pen 41, and enlargement and reduction of the displayed image are described with reference to FIG. 13.

First, the touch tablet 6A covering the LCD 6 is divided into four areas "A" through "D" which are an upper right area, a lower right area, an upper left area, and a lower left area. Then, as shown in FIG. 13A, if the dragging starting point "a" is in area A, and if the direction of the dragging is within a range between 0 degrees to 90 degrees, the CPU 39 designates the image at the dragging starting point "a" to be displayed at the center of the LCD 6 and enlarges the image at a magnification corresponding to the distance of the dragging. Conversely, if the dragging starting point "a" is in area A, and if the direction of the dragging is within a range between 180 degrees and 270 degrees, the CPU 39 designates the image at the dragging starting point "a" to be displayed at the center of the LCD 6 and reduces the image at a reduction corresponding to the distance of the dragging.

Figure 13C:
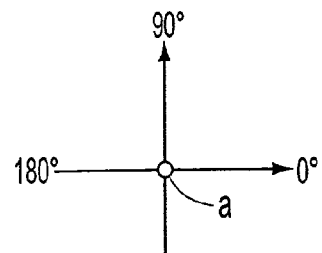
FIGS. 13A–13D illustrates a point-and-drag system for enlarging and reducing the image.
Figure 13C:
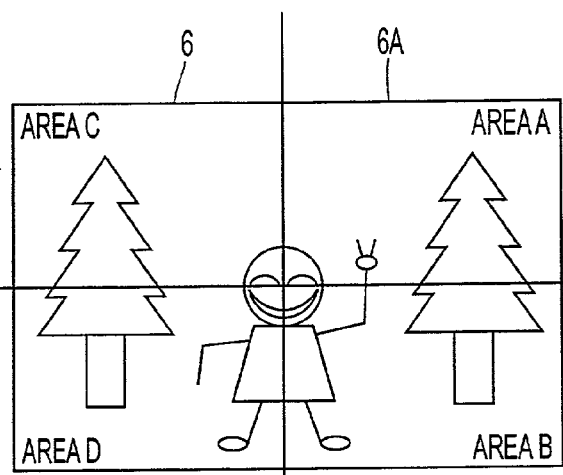
Figure 13A:
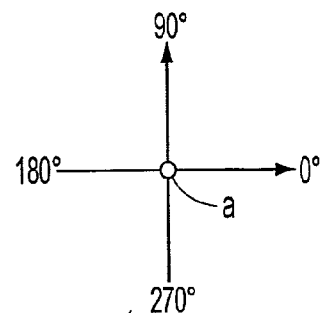
Figure 13D:
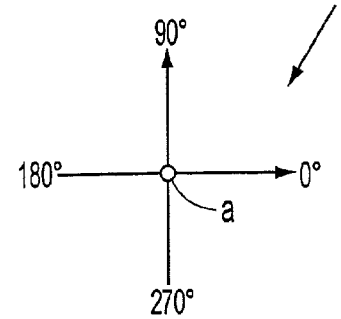
Figure 13B:
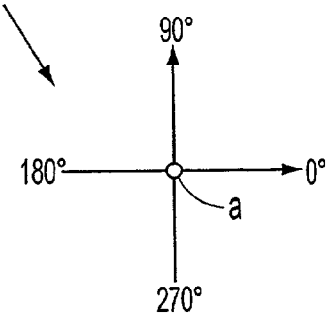
Figure 15:
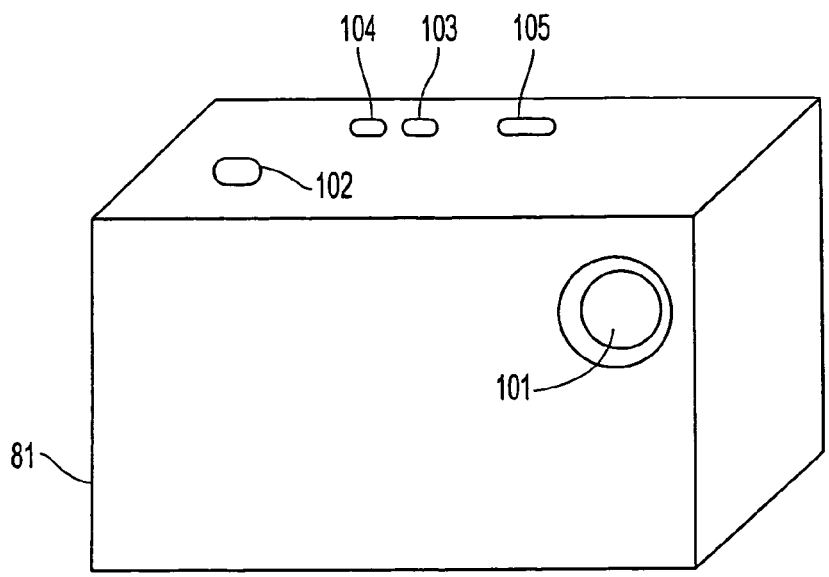
FIG. 15 is a front perspective view showing a conventional electronic camera.
Figure 16:
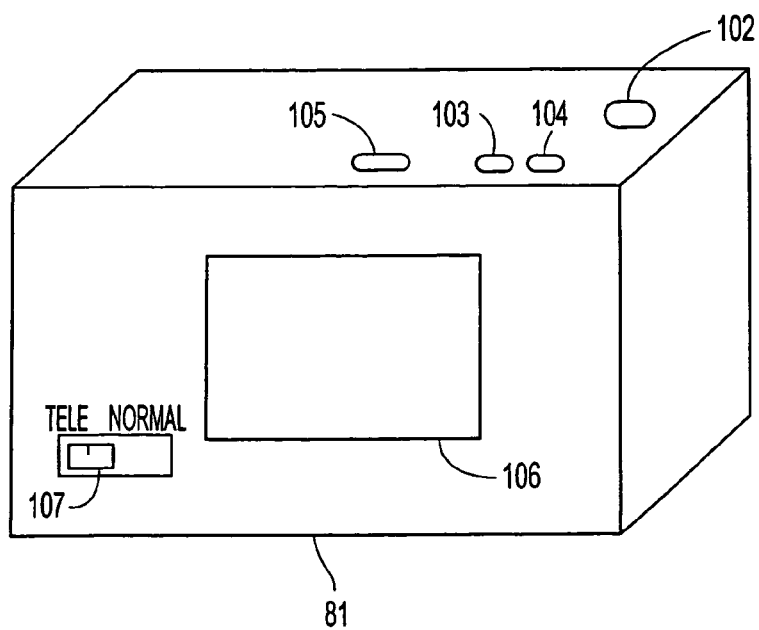
FIG. 16 is a rear perspective view of the conventional electronic camera shown in FIG. 15.
Figure 17:
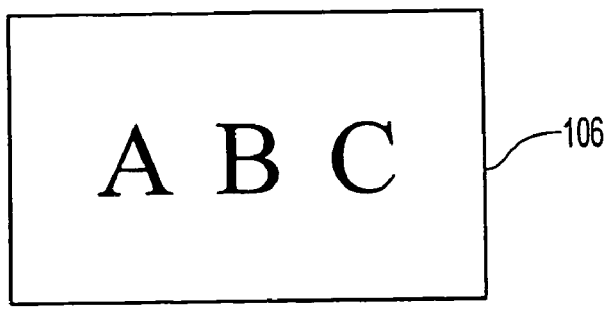
FIG. 17 shows an example of an image displayed on a liquid crystal display of the conventional electronic camera shown in FIGS. 15 and 16.
Figure 18:
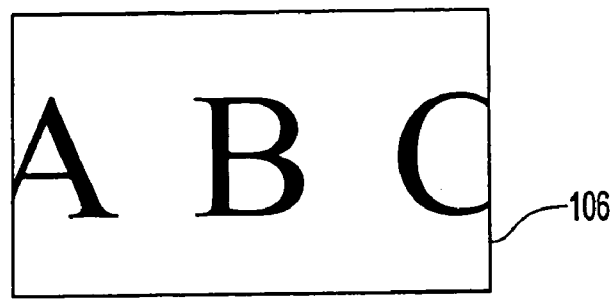
FIG. 18 illustrates an enlarged image of the displayed image shown in FIG. 17.
Figure 19:
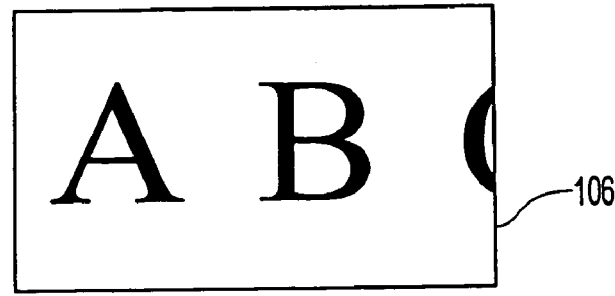
FIG. 19 illustrates a left side of the enlarged displayed image shown in FIG. 17.
Figure 20:
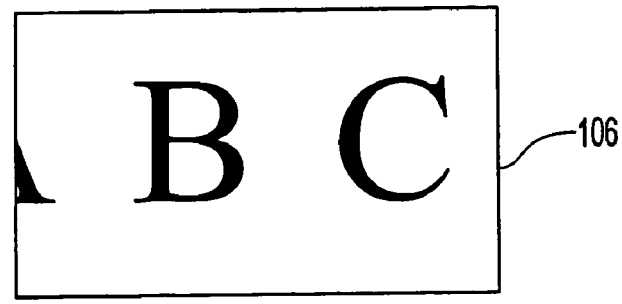
FIG. 20 illustrates a right side of the enlarged displayed image shown in FIG. 17.

Next, as shown in FIG. 13B, if the dragging starting point is in area B, and if the direction of dragging is within a scope between 0 degrees and 270 degrees, the CPU 39 designates the image at the dragging starting point "a" to be displayed at the center of the LCD 6 and enlarges the image at a magnification corresponding to the distance of the dragging. Conversely, if the dragging starting point "a" is in area B and if the direction of the dragging is within a range of 90 degrees and 180 degrees, the CPU 39 designates the image at the dragging starting point "a" to be displayed at the center of the LCD 6 and reduces the image at a reduction corresponding to the distance of the dragging.

Moreover, as shown in FIG. 13C, if the dragging starting point "a" is in area C, and if the direction of dragging is within a range between 90 degrees and 180 degrees, the CPU 39 designates the image at the dragging starting point "a" to be displayed at the center of the LCD 6 and enlarges the image at a magnification corresponding to the distance of the dragging. Conversely, if the dragging starting point "a" is in area C, and if the direction of the dragging is within a range between 0 degrees and 270 degrees, the CPU 39 designates the image at the dragging starting point "a" to be displayed at the center of the LCD 6 and reduces the image at a reduction corresponding to the distance of the dragging.

Then, as shown in FIG. 13D, if the dragging starting point "a" is in area D, and if the direction of dragging is within a range between 180 degrees and 270 degrees, the CPU 39 designates the image at the dragging starting point "a" to be displayed at the center of the LCD 6 and enlarges the image at a magnification corresponding to the distance of the dragging. Conversely, if the dragging starting point "a" is in area D and if the direction of the dragging is within a range between 0 degrees and 90 degrees, the CPU 39 designates the image at the dragging starting point "a" to be displayed at the center of the LCD 6 and reduces the image at a reduction corresponding to the distance of the dragging.

Moreover, if the direction of the dragging is not within the range set as described above, the enlargement or reduction of the image is not performed.

Or, the corresponding relationships between the direction of the dragging by the pen 41 and the enlargement and reduction of the displayed image can be set as described in FIG. 14. First, the touch tablet 6A covering the LCD 6 is divided into four areas A through D which are right upper area, right lower area, left upper area, and left lower area.

As shown in FIG. 14A, if the dragging starting point "a" is in area A and if the direction of the dragging is within a range between 0 degrees and 135 degrees or between 0 degrees and 315 degrees, the CPU 39 designates the image at the dragging starting point "a" to be displayed at the center of the LCD 6 and enlarges the image at a magnification corresponding to the distance of the dragging. Conversely, if the dragging starting point "a" is in area A and if the direction of the dragging is within a range between 135 degrees and 180 degrees or between 180 degrees and 315 degrees, the CPU 39 designates the image at the dragging starting point "a" to be displayed at the center of the LCD 6 and reduces the image at a reduction corresponding to the dragging distance.

Next, as shown in FIG. 14B, if the dragging starting point "a" is in area B, and if the direction of the dragging is within a range between 0 degrees and 45 degrees, the CPU 39 designates the image at the dragging starting point "a" to be displayed at the center of the LCD 6 and enlarges the image at the magnification corresponding to the distance of the dragging. Conversely, if the dragging starting point "a" is in area B, and if the direction of the dragging is within a range between 45 degrees and 180 degrees or 180 degrees and 225 degrees, the CPU 29 designates the image at the dragging starting point "a" to be displayed at the center of the LCD 6 and reduces the image at a reduction corresponding to the dragging distance.

Moreover, as shown in FIG. 14C, if the dragging starting point "a" is in the area C, and if the direction of the dragging is within a range between 45 degrees and 180 degrees or 180 degrees and 225 degrees, the CPU 39 designates the image at the dragging starting point "a" to be displayed at the center of the LCD 6 and enlarges the image at a magnification corresponding to the distance of the dragging. Conversely, if the dragging starting point "a" is in area C, and if the direction of the dragging is within a range between 0 degrees and 45 or 0 degrees and 225 degrees, the CPU 29 designates the image at the dragging starting point "a" to be displayed at the center of the LCD 6 and reduces the image at a reduction corresponding to the dragging distance.

Then, as shown in FIG. 14D, if the dragging starting point "a" is in the area D, and if the direction of the dragging is within a range between 135 degrees and 180 degrees and 180 degrees and 315 degrees, the CPU 39 designates the image at the dragging starting point "a" to be displayed at the center of the LCD 6 and enlarges the image at a magnification corresponding to the distance of the dragging. Conversely, if the dragging starting point "a" is in area D and if the direction of the dragging is within a range between 0 degrees and 135 degrees and 0 degrees and 315 degrees, the CPU 39 designates the image at the dragging starting point "a" to be displayed at the center of the LCD 6 and reduces the image at a reduction corresponding to the dragging distance.

By performing the above operations, desired portions in the displayed image can be enlarged. In addition, the enlarged or reduced image can be returned to its original size by touching any point on the touch tablet 6A two consecutive times by the pen 41.

Next, explanation is made for the operations of the second embodiment of the present invention when changing the focal length of the shooting lens 3 by using the touch tablet 6A at the time of shooting the object.

At the time of shooting the object, the CPU 39 detects the distance and the direction of the dragging on the touch tablet 6A in the same manner as the operations for changing the magnifications of the reproduced image described above. Then, the CPU 39 determines the direction for changing the focal length according to the direction of the dragging and changes the focal length of the shooting lens 3 in response to the distance of the dragging.

The corresponding relationships between the direction of the dragging and the direction for changing the focal length is set in the same manner as the corresponding relationships between the direction of the dragging and the direction for changing the size of the displayed image at the time of displaying the previously recorded image (FIG. 13 and FIG. 14). In other words, when the same operations as those for enlarging the displayed image at the time of displaying the previously recorded image are performed for the touch tablet 6A at the time of shooting the image, the CPU 39 controls the zoom driving circuit 43 to increase the focal length of the shooting lens 3. Conversely, when the same operations as those for reducing the displayed image at the time of displaying the previously recorded image are performed, the CPU 39 controls the zoom driving circuit 43 to reduce the focal length of the shooting lens 3.

In addition, when displaying the previously recorded image, the image at the dragging starting point is displayed at the center of the LCD 6. However, when shooting the object, only the focal length of the shooting lens is changed.

Moreover, when the focal length becomes longer than the preset upper limit as a result of operations for the touch tablet 6A, the CPU 39 changes to digital zooming after moving the second lens 3B (that is a component of the shooting lens 3) to its upper limit value of the focal length, and performs signal processing on the image signals of the optically received image by the CCD 20. Then, by electronically changing the magnification of the image of the object, the image of the object is enlarged at a magnification corresponding to an amount which exceeds the upper limit value of the focal length and is displayed on the LCD 6.

On the other hand, if the focal length becomes shorter than the preset lower limit value as a result of the operations for the touch tablet 6A, the CPU 39 moves the second lens 3B such that the focal length becomes the lower limit value. At this time, no special operations are performed for reducing the image of the object using the digital zoom.

As described above, in the electronic camera of the second embodiment of the present invention, if the zoom button 15 is operated in the same way as the first embodiment, the focal length of the shooting lens 3 can be changed and, in response thereto, the size of the displayed image is changed at the time of shooting the image. Operation of the zoom button 15 also changes the size of the previously recorded image at the time of displaying such an image. Then, by using the touch tablet 6A, the focal length of the shooting lens 3 at the time of shooting the object can be changed and the size of the displayed image at the time of displaying the image can also be changed.

Furthermore, in the second embodiment of the present invention, when the focal length becomes longer than the preset upper value as a result of operating the touch tablet 6A, the CPU 39 changes to the digital zoom after the second lens 3B is moved its upper limit of focal length. However, the structure can be made so that only the second lens 3B is movable to change the focal length to the upper limit value. Thus, the digital zoom can be eliminated from the present invention. In this case, the image of the object to be displayed on the LCD 6 could not be enlarged beyond magnification higher than when the focal length is at the upper limit value.

In the above embodiments, an explanation was provided for an electronic camera in which the focal length of a shooting lens 3, also known as a zoom lens, can be changed. However, the present invention also is applicable to electronic cameras that have a single focusing lens with a fixed focal length and that rely on a digital zoom process, for example, as described in the second embodiment, to change the magnification of the image of the object during shooting of the object by actuating a zoom button 15 or a touch tablet 6A.

What is claimed is:

1. A digital electronic camera, comprising:
   a shooting lens that collects light from an object;
   a photoelectric conversion element that receives light from the object that is collected by said shooting lens and converts the collected light into electric signals representative of the object;
   a memory that stores image data representative of objects;
   a display that displays images of the object corresponding to the electric signals converted by said photoelectric conversion element and displays images corresponding to the image data read from said memory;
   a zoom designation device that is operable by a user to specify a change in magnification of the image displayed on said display;
   an operating device that is operable by the user to specify a move of a central point of the image displayed on said display; and
   a controller that changes the magnification of the image displayed on said display in response to said zoom designation device, regardless of whether the displayed image is supplied from said photoelectric conversion element or from said memory;
   wherein said controller, responsive to said operating device, moves the central point of the image displayed on said display when the displayed image is supplied from said memory and does not move the central point of the image displayed on said display when the displayed image is supplied from said photoelectric conversion element.

2. The digital electronic camera claimed in claim 1, wherein said controller interpolates pixel values of said displayed image to magnify the displayed image.

3. The digital electronic camera claimed in claim 1, wherein said controller changes the magnification of the image of the object converted into electric signals by said photoelectric conversion element without changing a focal length of said shooting lens.

4. The digital electronic camera claimed in claim 1, wherein said controller changes the magnification of the image of the object converted into electric signals by said photoelectric conversion element by changing a focal length of said shooting lens.

5. The digital electronic camera claimed in claim 1, wherein said zoom designation device is a single member that is operable by the user.

6. The digital electronic camera claimed in claim 1, wherein said zoom designation device includes a touch screen operative to generate data signals for processing by said controller.

7. The digital electronic camera claimed in claim 6, wherein touching a first point on said touch screen and moving to a second point on said touch screen while maintaining contact with said touch screen to form a line between the first point and the second point causes the displayed image to either be magnified or reduced to a size relative to a distance between the first and second points and an angle formed relative to an imaginary horizontal line and the straight line.

8. The digital electronic camera claimed in claim 7, wherein, when the displayed image is magnified, the first point is centrally disposed within the display screen.

9. The digital electronic camera claimed in claim 7, wherein said touch screen includes a centering region disposed on the display screen when the displayed image is reduced and, touching the centering region causes the reduced display image to appear centrally within the display screen.

10. The digital electronic camera claimed in claim 1, wherein said controller determines whether the displayed image is supplied from said photoelectric conversion element or from said memory.

* * * * *